United States Patent [19]

Smith et al.

[11] Patent Number: 4,494,106
[45] Date of Patent: Jan. 15, 1985

[54] PRESSURE MONITOR

[75] Inventors: Guy L. B. Smith, Transvaal; Derik Howard, Johannesburg; Anton B. Goedhals, Transvaal, all of South Africa

[73] Assignee: Grathnail Development Company Limited, Jersey, Channel Islands

[21] Appl. No.: 349,757

[22] Filed: Feb. 18, 1982

[30] Foreign Application Priority Data

Feb. 18, 1981 [ZA] South Africa .................. 81/1063

[51] Int. Cl.³ .............................................. B60C 23/00
[52] U.S. Cl. ....................................... 340/58; 340/510; 340/626; 340/870.09; 340/870.16; 200/61.22; 73/146.5
[58] Field of Search ................. 340/58, 52 R, 60, 510, 340/511, 588, 626, 870.01, 870.09, 870.16, 870.17, 870.21, 870.27; 200/61.22; 73/146, 146.2, 146.5; 116/34 R, 34 A, 34 B

[56] References Cited

U.S. PATENT DOCUMENTS

| | | | |
|---|---|---|---|
| 2,669,876 | 2/1954 | Lentz | 340/58 |
| 3,155,938 | 11/1964 | Meyers | 340/58 |
| 3,281,784 | 10/1966 | Farthing | 340/58 |
| 4,090,172 | 5/1978 | Vesnic | 340/58 |

FOREIGN PATENT DOCUMENTS 942904 5/1956 Fed. Rep. of Germany.

Primary Examiner—Donnie L. Crosland
Attorney, Agent, or Firm—McGlew and Tuttle

[57] ABSTRACT

A tire pressure monitor which includes a signal generating section and a signal processing section. The signal generating section has a transducer which produces a first signal which is dependent on the tire pressure, and a transistor the collector current of which is controlled by the first signal. The signal generating section is supplied with power from a battery source and the current so supplied includes the collector current and is therefore dependent on the tire pressure. The signal processing section includes a monitor which monitors the supply current to the signal generating section and a display for providing an indication of the tire pressure.

6 Claims, 4 Drawing Figures

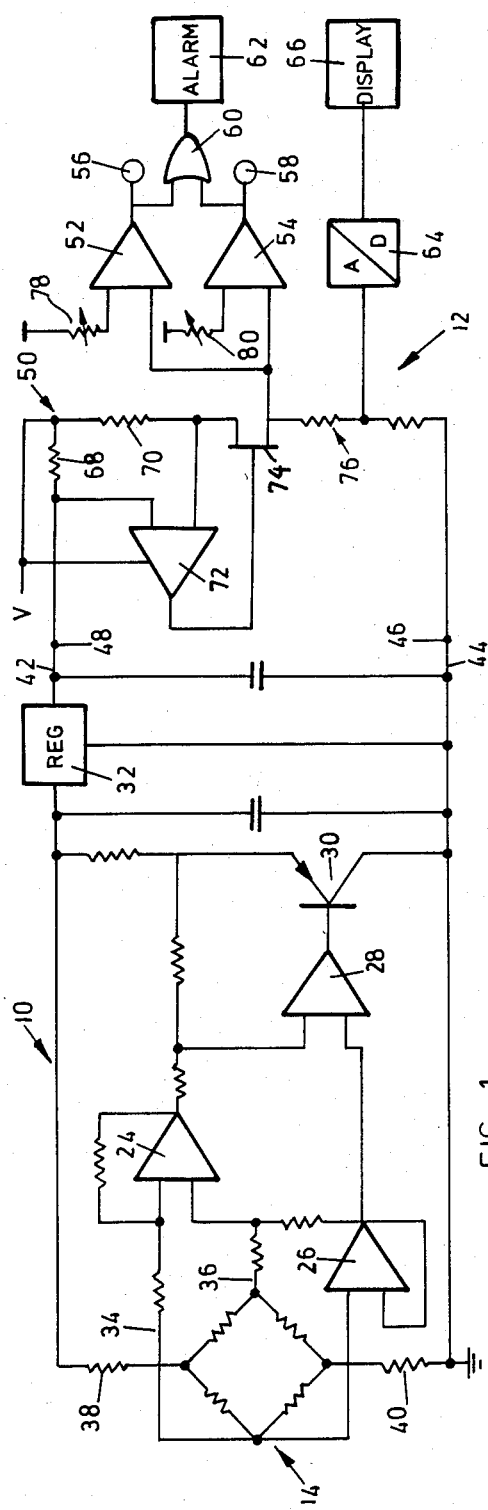
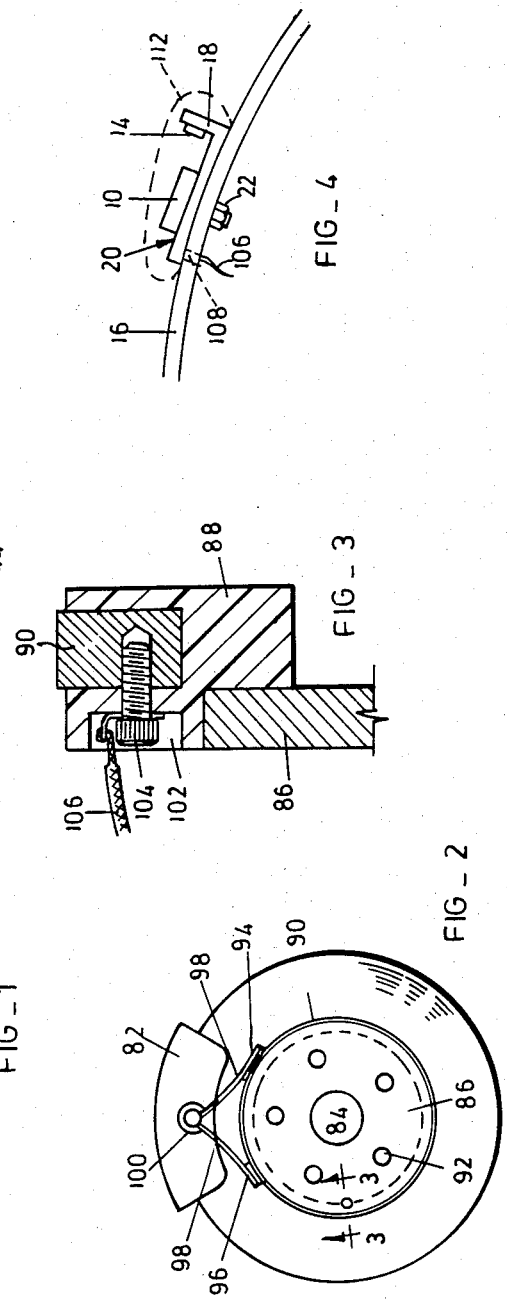

PRESSURE MONITOR

BACKGROUND OF THE INVENTION

This invention relates to the monitoring of the pressure of the tires of a vehicle.

The operating life of a vehicle tire which is under or over inflated can be significantly reduced, and this has significant financial implications when one considers the cost of tires, especially for large road vehicles and for aircraft. Apart from this there is the safety aspect for the handling characteristics of the vehicle, or aircraft, with underinflated tires deteriorate and, moreover, the operating costs under such circumstances is increased because of the increase in rolling friction.

Many solutions have been proposed in the patent literature to the problem and such solutions are exemplified in the specifications of the following patents: U.S. Pat. Nos. 2,727,721, 3,016,515, 3,588,815, 3,713,092, 3,805,229, 3,938,077, 3,950,726, 4,037,192, 4,048,614, 4,210,898, 4,059,823, 2,248,047, 3,281,784, 3,697,947, 3,757,295, 3,662,335, 3,723,966, 4,006,449, 4,208,649, 4,237,445, 3,155,938 and 3,249,916, and in German Pat. No. 942904.

Broadly speaking the solutions fall into two categories. In the first category use is made of radio techniques for transmitting a signal from the tire to the vehicle while in the second category use is made of hard wire techniques or static devices i.e. devices which are not electrically powered to provide an indication of the tire pressure.

The first category of devices can make use of transponders but normally active transmitters are built into each wheel and consequently there is the need for a self-contained power source in the wheel. With the second category of devices and referring particularly to the hard wire device power is supplied to pressure sensing means in the wheel from an external power source. With this kind of device the question of signal processing is of critical importance.

Of the aforementioned patent specifications four warrant closer examination. In U.S. Pat. No. 3,281,784 use is made of a bridge circuit and a galvanometer which proves an indication of pressure increase or decrease. This device suffers from the disadvantage that it requires an initial calibration and moreover the readout is not directly proportional to the tire pressure. In U.S. Pat. No. 4,237,445 use is made of a Bourdon tube which communicates with internal tire pressure to regulate a magnetic gap of an electromagnetic induction configuration. U.S. Pat. No. 2,248,047 discloses a mechanical switching device which is mounted externally on the wheel and which employs two slip ring assemblies for conveying a signal to the interior of a vehicle. German Pat. No. 942904 discloses an analogue system wherein the current through a device, the resistance of which is determined by tire pressure, is monitored.

In all of the prior art devices there are various shortcomings. Generally it may be said that these shortcomings relate to the difficulty of installing the tire pressure monitor on the wheel in question and secondly to the manner in which the signal is conveyed from the tire to inside the vehicle. Intimately associated therewith is the question of powering the pressure sensing device.

SUMMARY OF THE INVENTION

It is an object of the present invention to provide improved apparatus for monitoring the pressure of a tire of a vehicle. In this specification the word "vehicle" is used generally to denote any vehicle including particularly road vehicles. However aircraft and any other vehicle which includes ground engaging tires are included within the meaning of "vehicle".

The invention provides apparatus for monitoring the pressure of a tire of a vehicle which comprises signal generating means, signal processing means, and means for supplying electrical energy to the signal generating means from a power source on the vehicle, the generating means including transducer means for generating a first signal which is dependent on the pressure inside the tire, and control means, responsive to the first signal, for producing a second signal which is applied to the signal processing means by the electrical energy supply means, the signal processing means including enunciator means for providing an indication of the tire pressure.

In a preferred embodiment of the invention the signal processing means is located outside the tire, and the signal generating means inside the tire.

The electrical energy supply means may include at least one conductive slip ring which is rotatable with the tire, and brush means which is engaged with the slip ring and which is connected to the power source. Normally one slip ring would be provided for each tire on a vehicle hub. For example on a light motor vehicle with a single pair of wheels on each axle one slip ring will be provided at each end of the axle. On the other hand with a heavy road vehicle which may include two or more pairs of wheels on each axle a slip ring will be provided for each of the wheels at each end of the axle.

The control means may include at least one transistor the collector current of which is supplied by the electrical energy supply means, and the base current of which is determined at least partly by the first signal.

The signal generating means may include a voltage regulator which is connected to the electrical energy supply means and which supplies a stabilized power source to the transducer means and to the control means.

In accordance with the invention the second signal is constituted by the electrical current supplied to the signal generating means by the electrical energy supply means. This feature enables the apparatus of the invention to function with only two electrical connections being made between it and the power source. Essentially the signal generating means acts to vary the supply current output by the electrical energy supply means. Thus the first signal is in effect impressed on the power supply signal.

The signal processing means may include a current monitor for monitoring a current which is proportional to the second signal. This passive observation technique carries with it the advantage that the second signal is not materially altered by the enunciator.

BRIEF DESCRIPTION OF THE DRAWINGS

The invention is further described by way of example with reference to the accompanying drawings in which:

FIG. 1 illustrates the electrical circuit of apparatus according to the invention, FIG. 2 is a simplified view in elevation of portion of a wheel on which is installed the apparatus of the invention, FIG. 3 is a view in section of part of the assembly shown in FIG. 2, taken on the line 3—3, and FIG. 4 is a cross-section through a portion of the rim of the wheel on which the apparatus of the invention is installed.

DESCRIPTION OF PREFERRED EMBODIMENT

FIG. 1 illustrates the electrical circuit of apparatus according to one embodiment of the invention. The electrical circuit, as shown in this Figure, consists essentially of two main components, namely a signal generating section 10 and a signal processing section 12. These two sections are interconnected by means of the mechanical arrangement shown generally in FIGS. 2 and 3 which functions as means for supplying electrical energy to the signal generating section and simultaneously as means for applying the signal produced by the section 10 to the signal processing section 12.

The signal generating section 10 includes an ultra-miniature pressure transducer 14 which, as shown in FIG. 4, is mounted on the rim 16 of a vehicle wheel on a radially extending portion 18 of an angle piece 20. The piece 20 is bolted to the rim 16 by means 22. The transducer 14 is aligned radially so that centrifugal effects on it, due to rotation of the wheel, are minimized. A suitable transducer is the PS-A or B type sold by KYOWA ELECTRONIC INSTRUMENTS COMPANY LIMITED of Tokyo, Japan. The pressure range of the transducer is selected according to the maximum pressure which may be encountered in the tire.

The remainder of the circuitry of the signal generating section 10 is also mounted on the angle piece 20. Referring again to FIG. 1 the balance of the circuitry includes three operational amplifiers 24, 26 and 28 respectively, a transistor 30 and a voltage regulator 32.

The amplifier 24 is connected as a differential amplifier and its two inputs are connected to the two output leads 34 and 36 respectively of the transducer 14 which essentially is of a bridge configuration. The amplifier 26 is connected to the output 34 so as to provide a stable reference for the different amplifier 24.

The amplifier 28 functions as an inverting stage with inputs from the amplifiers 24 and 26 and with feedback from the emitter of the transistor 30. This feedback increases the gain of the amplifier 28.

Power is supplied to the circuitry from the voltage regulator 32 and the voltage across the transducer 14 is fixed at a suitable value by means of series connected resistors 38 and 40 respectively.

The section 10 has two leads 42 and 44 respectively. The lead 44 is connected to the chassis of the vehicle via an electrical path which passes through the bearings of the wheel. To improve the electrical conductivity of this path the bearings can be packed with electrically conductive grease. In FIG. 1 the bearing connection to earth is indicated schematically simply by a terminal 46.

Power is supplied to the regulator 32 and thence to the remainder of the circuitry via the lead 42 which is connected to a supply V derived from the battery of the vehicle. The connection of the lead 42 to the supply V is via a slip ring arrangement which is shown in FIGS. 2 and 3 and which is indicated schematically in FIG. 1 simply by a terminal 48.

The signal processing section 12 shown in FIG. 1 includes a current monitor 50, two comparators 52 and 54 respectively, light indicators such as light emitting diodes 56 and 58 respectively, an OR gate 60, an alarm circuit 62, an analog to digital converter 64 and a display 66.

The current monitor 50 includes a supply resistor 68 and a proportional resistor 70 connected to an amplifier 72 and a field effect transistor 74. Current supplied from the supply V is divided in a fixed ratio between the resistors 68 and 70. Current flowing through the resistor 68 goes to the section 10 while current flowing through the resistor 70, which current is proportional to the current supplied to the section 10, is monitored by the amplifier 72 and transistor 74. The current output by the transistor 74 flows through a resistive voltage divider 76 the junction point of which is connected to the converter 64.

The display 66 is preferably a visual display such as a numeric liquid crystal display. The alarm 62 may be a visual but preferably is an audible alarm which is sounded when either one of the diodes 56 or 58 is energised. The points at which energization of these diodes take place are determined by means of variable resistors 78 and 80 respectively. These resistors may be preset or alternatively adjusted inside the vehicle as desired according to the limiting tire pressures which are considered acceptable.

The mechanical arrangement of the terminal designated generally as 48 in FIG. 1 is shown in FIGS. 2 and 3. In this particular example the wheel on which the tire pressure monitor is mounted has a disc brake with brake calipers 82. Mounted on the hub 84 of the wheel is a steel plate 86 the periphery of which carries an epoxy base 88 in which is partially embedded a phosphor bronze conductive ring 90. The plate 86 has holes which fit directly over the wheel studs 92 of the hub and thus the plate is kept in position when the wheel with the tire is bolted in position. Two brushes 94 and 96 are mounted on arms 98 which extend from an insulated base 100 fixed to the calipers 82. The arms 98 are biased inwardly so that the brushes 94 and 96 at all times bear firmly on the conductive ring 90 thereby ensuring sound electrical connections between the brushes and the slip ring.

As shown in FIG. 3 the base 88 has a hole 102 formed in it and a screw 104 is threadedly engaged with the slip ring 90. The screw effects an electrical connection between the conductive ring and an insulated conductor 106 which passes through a hole 108 in the wheel rim 16, as shown in FIG. 4, and which extends from the signal processing section 10 located inside the wheel. The lead 106 corresponds to the lead 42 shown in FIG. 1. The lead 44 shown in FIG. 1 is not illustrated in FIGS. 2 to 4 and is constituted simply by a direct electrical connection between the section 10 and the rim 16.

In operation of the device electrical power is supplied to the section 10 from the supply V via the slip ring and brush assembly shown in FIGS. 2 and 3. The power is stabilized in the voltage regulator 32 and a steady voltage is therefore applied to the remainder of the circuitry 10. The voltage is divided by the resistors 38 and 40 and a reduced voltage of a predetermined magnitude is applied to the transducer 14. The balance of the bridge circuit embodied in the transducer is affected by pressure variations and this is reflected in a resistance change which affects the voltage at the output terminals of the bridge. The voltage variation between the output terminals is detected and amplified by the difference amplifier 24 and, in the manner previously described, due allowance is made for variations in the reference level by means of the amplifier 26. Output current from the amplifier 24 is inverted in the stage 28 and amplified with increased gain due to the feedback from the transistor 30. The collector current of the transistor is controlled by means of its base current and this current in turn is supplied by the amplifier 28. In other words the collector current is determined by the base current which in turn is dependent on the pressure to which the transducer 14 is exposed.

The collector current of the transistor 30 together with the quiescent current of the various amplifiers constitutes the total current supplied by the voltage regulator 32. The quiescent currents of the operational amplifiers are kept steady by suitable design to compensate inter alia for thermal effects.

It should be stressed that the current supplied to the signal generating section 10 from the source V is used to power the circuitry and simultaneously is the means used to convey information on the pressure inside the tire to the signal processing section 12. The current passing from the supply V to the section 10 flows through the resistor 68 and this resistor is preferably of a large power rating so that if the terminal 48 is accidently grounded there is little likelihood of circuit damage.

It has already been pointed out that the current drawn by the section 10 is proportional to the current passing through the resistor 70. This latter current is essentially the same as that flowing through the voltage divider 76 and thus the voltage drop across the voltage divider is proportional to or dependent on the tire pressure. The analog voltage signal produced by the voltage divider is digitized by the converter 64 and a digital display is provided by the unit 66 inside the vehicle so that a direct and continuous visual indication of the tire pressure is available.

The analog voltage signal which represents tire pressure is also applied, before division, to the two comparators 52 and 54. The comparator 52 is set via the adjustable resistor 78 to switch when an upper tire pressure limit is reached while the other comparator is adjusted in a similar way to switch when a lower acceptable tire pressure limit is reached. The outputs of the two comparators are applied through the OR gate 60 to the alarm 62 so that this device is energized when either of the comparators switches. In each case one of the light emitting diodes 56 or 58 is energized indicate an upper or lower tire pressure limit.

The advantage of the invention lies in the fact that only one lead is required to the circuitry located inside the tire. This lead is the one which passes through the terminal 48 shown schematically in FIG. 1. The return connection for the electrical current is, as mentioned before, constituted by the bearing connection between the tire rim and the vehicle chassis. The apparatus is able to function in this way because the lead in question is used to power the signal generating section 10 and simultaneously the current supplied to this section is, because of the circuitry design, kept dependent on the tire pressure. The circuitry of the section 10 is extremely small and consequently is easily mounted inside the vehicle tire with a minimum of interference or likelihood of damage. For example the transducer 14 has a diameter of approximately 6 mm and a thickness of 0.6 mm. The radial section 18 on which the transducer is mounted, see FIG. 4, is approximately 1 cm in height.

The invention has been described thus far in respect of one wheel only. Circuitry identical to the signal generating section 10 can of course be installed in each wheel of a vehicle the pressure of which is to be monitored. Under such conditions it is a relatively simple matter to switch the signal processing section 12 automatically between the various signal generating sections so that all the tires are continuously monitored successively and in sequence. Sampling in this way is readily effected by means of a multiplexer.

Finally is should again be pointed out that although it is envisaged that the primary application of the apparatus of the invention will be in connection with road vehicles there is no restriction whatsoever on its use in aircraft tires and applications of this nature are intended to fall within the scope of the invention.

Apparatus of the kind illustrated has been extensively tested on road vehicles. It has been found that the reliability of the apparatus is extremely good and that it is able to detect tire pressure variations of 0.01 bar.

The invention has been described in relation to disc brake vehicles. It is equally applicable however to vehicles with drum brakes. When the invention is used with tires with tubes the internal tube pressure can be applied to the transducer mounted in an air tight chamber via a pipe coupled to the valve of the tube. Alternatively the air tight chamber can be pre-pressurized and formed with a flexible wall and be located inside the tire so that the flexible wall is in contact with the tube. In this way pressure variations in the tube are transferred to the chamber, via the flexible wall, and so are detected by the transducer. This configuration is indicated schematically in FIG. 4 where the dotted line 112 represents an air tight chamber with a flexible wall. Clearly if the signal generating section 10 is packaged in this way it makes no difference whether the tire is a tubeless tire, or is fitted with a tube, at least for a predetermined pressure range.

Thus the transducer and the signal processing section 10 may, depending on the circumstances, be inside or outside the tire. If the transducer is mounted outside the tire it is again, preferably, mounted so as to minimize the effects of centrifugal forces on it.

We claim:

1. An apparatus for continuously providing a measurement of pressure in a tire of a vehicle, comprising: signal generating means; signal processing means; current supply means connected to said signal generating means and to said signal processing means; said current supply means supplying a first electrical current to said signal generating means and a second electrical current to said signal processing means, said current supply means having a circuit connection so that said first and second electrical currents are always in a substantially fixed ratio to each other; said signal generating means including transducer means for generating a first signal which is dependent on the pressure inside the tire; and a control means connected to said transducer means and to said current supply means, said control means being responsive to the first signal for varying said first electrical current in dependence on said tire pressure; said signal processing means monitoring said second electrical current thereby to provide a continuous indication of said tire pressure.

2. An apparatus according to claim 1 wherein the signal processing means is located outside the tire, and the signal generating means is located inside the tire.

3. An apparatus according to claim 1 wherein the signal generating means includes voltage regulator means connected to the electrical energy supply means for applying a stabilized power source to the transducer means and to the control means.

4. An apparatus according to claim 1 wherein the signal processing means includes means for detecting at least one limiting value of said second electrical current.

5. An apparatus according to claim 1, wherein said control means includes at least one transistor with a collector current which is drawn from said first electrical current, and a base current which is determined at least partly by the first signal.

6. An apparatus according to claim 1, in which said signal processing means includes an analog to digital converter which is responsive to said second electrical current for providing a digital measure of said tire pressure.

* * * * *